(12) United States Patent
Son et al.

(10) Patent No.: US 6,407,865 B1
(45) Date of Patent: Jun. 18, 2002

(54) METHOD FOR FABRICATING A LENTICULAR PLATE

(75) Inventors: Jung Young Son, Seoul (KR); Vadim V. Smirnov, St. Petersburg (RU)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/573,384

(22) Filed: May 18, 2000

Related U.S. Application Data

(62) Division of application No. 09/160,590, filed on Sep. 25, 1998, now Pat. No. 6,226,131.

(30) Foreign Application Priority Data

Sep. 25, 1997 (KR) ............................................. 97-48694

(51) Int. Cl.⁷ .......................... G02B 27/10; G03C 5/00; G03B 21/60
(52) U.S. Cl. ...................... 359/619; 430/321; 430/325; 430/326; 359/455; 359/900
(58) Field of Search ................................ 359/455, 463, 359/619, 738, 900; 355/77; 264/1.1, 2.7; 430/5, 312, 313, 321, 322, 325, 326, 290, 396, 946

(56) References Cited

U.S. PATENT DOCUMENTS

| | | | | |
|---|---|---|---|---|
| 3,775,110 A | * | 11/1973 | Bestenreiner et al. | 430/396 |
| 3,893,856 A | * | 7/1975 | Bestenreiner et al. | 430/321 |
| 5,148,319 A | * | 9/1992 | Gratrix et al. | 359/642 |
| 5,912,725 A | * | 6/1999 | Tanitsu | 355/53 |
| 6,226,131 B1 | * | 5/2001 | Son et al. | 359/738 |

FOREIGN PATENT DOCUMENTS

| | | | | |
|---|---|---|---|---|
| JP | 4-135744 | | 5/1992 | |
| JP | 11231107 A | * | 8/1999 | G02B/3/00 |
| RU | 1817579 A1 | | 3/1989 | |

OTHER PUBLICATIONS

Compilation of Next Generation Optical Technology, pp. 341–347, "LENTICULAR 3–D DISPLAY" written by Tetsutani Shinji, published on Dec. 10, 1992 by Optronics Co., Ltd. publishers.

* cited by examiner

*Primary Examiner*—Georgia Epps
*Assistant Examiner*—David N. Spector
(74) *Attorney, Agent, or Firm*—Oblon, Spivak, McClelland, Maier & Neustadt, P.C.

(57) ABSTRACT

An apparatus for fabricating a lenticular plate by irradiating with laser light a plate to which a photosensitive material is deposited. The apparatus for fabricating a lenticular plate comprises a collimator for collimating a beam from a laser to a predetermined diameter, a mask for adjusting the intensity distribution of the collimated beam, a photoplate on which a layer of photosensitive material is deposited, means for directing the beam which has passed through the mask to a desired region of the photoplate, and means for controlling the mask and the means for directing the beam such that the beam of predetermined intensity distribution irradiates on the desired region of the photoplate.

6 Claims, 3 Drawing Sheets

METHOD FOR FABRICATING A LENTICULAR PLATE

This application is a Division of application Ser. No. 09/160,590, filed on Sep. 25, 1998, now U.S. Pat. No. 6,226,131 B1.

BACKGROUND OF THE INVENTION

1. Field of the Invention

The present invention relates to an apparatus and method for fabricating a lenticular plate, more specifically, to an apparatus and method for fabricating a lenticular plate by irradiating with laser light a plate to which a photosensitive material has been deposited.

2. Description of the Related Art

A lenticular plate, also known as a relief lens raster screen, is a plate on which cylindrically symmetric relief lenses of diameters ranging from several hundred μm to several mm are arranged. In general, the lenticular plate is used as a screen for displaying three-dimensional images or multi-view pictures or used as a transmission diffraction grating for diffracting light into a particular direction. An apparatus for displaying three-dimensional images by means of a lenticular plate is described in "Lenticular 3-D Display" at pages 341–347 of Compilation of Next Generation Optical Technology, published by Ohutoroniwasu, Co., Japan.

In a conventional method for fabricating a lenticular plate, described in Japanese Laid-Open Patent Publication No. hei-4-35744 for "A Method for Manufacturing Packaging Material of Diffraction Grating," a master plate for the lenticular plate is formed by engraving rows of cylindrically symmetric lens shapes having desired parameters on a metal (e.g., bronze) plate and the lenticular plate is formed by compressing a layer of a plastic, such as acryl or poly chlorovinyl, against the master plate, which functions as a mold. According to this method, however, a new master plate must be formed whenever the characteristics of the lenticular plate is changed. It is also difficult to form lens shapes having different parameters on a single master plate.

According to another conventional method for fabricating a lenticular plate, described in Russian Patent Publication No. SU-1817579 by Ivlyushkm A. N., 1996, a glass plate onto which a. layer of dichromated gelatin (DCG) has been deposited is exposed to an infrared light through a mask having parallel slits. The DCG hardens in proportion to the time-integrated intensity of the light absorbed. The shortcoming of this method is that the DCG layers must be coated and developed two times on the same glass plate. Moreover, a new mask must be formed whenever the characteristics of a lenticular plate are changed.

SUMMARY OF THE INVENTION

An object of the present invention is accordingly to provide a low-cost apparatus for fabricating a lenticular plate wherein a new master plate is not required in order to form a lenticular plate having different characteristics.

Another object of the present invention is to provide a method for making a lenticular plate or relief lens raster screen of desired characteristic by applying laser beams to a plate on which a photosensitive material is deposited through a mask which may adjust the intensity of laser beam to solidify the photosensitive material into the form of cylindrical lenses.

In accordance with one aspect of the present invention, an. apparatus for fabricating a lenticular plate by irradiating with laser light a plate to which a photosensitive material is deposited is provided. The apparatus for fabricating a lenticular plate comprises a collimator for collimating a beam from a laser to a predetermined diameter, a mask for adjusting the intensity distribution of the collimated beam, a photoplate on which a layer of photosensitive material is deposited, means for directing the beam which has passed through the mask to a desired region of the photoplate, and means for controlling the mask and the means for directing the beam such that the beam of predetermined intensity distribution irradiates on the desired region of the photoplate.

BEEF DESCRIPTION OF TE DRAWINGS

The aforementioned aspects and other features of the invention are explained in the following detailed description and illustrated in the accompanying drawings wherein.

DETAILED DESCRIPTION OF THE INVENTION

Figure 1:
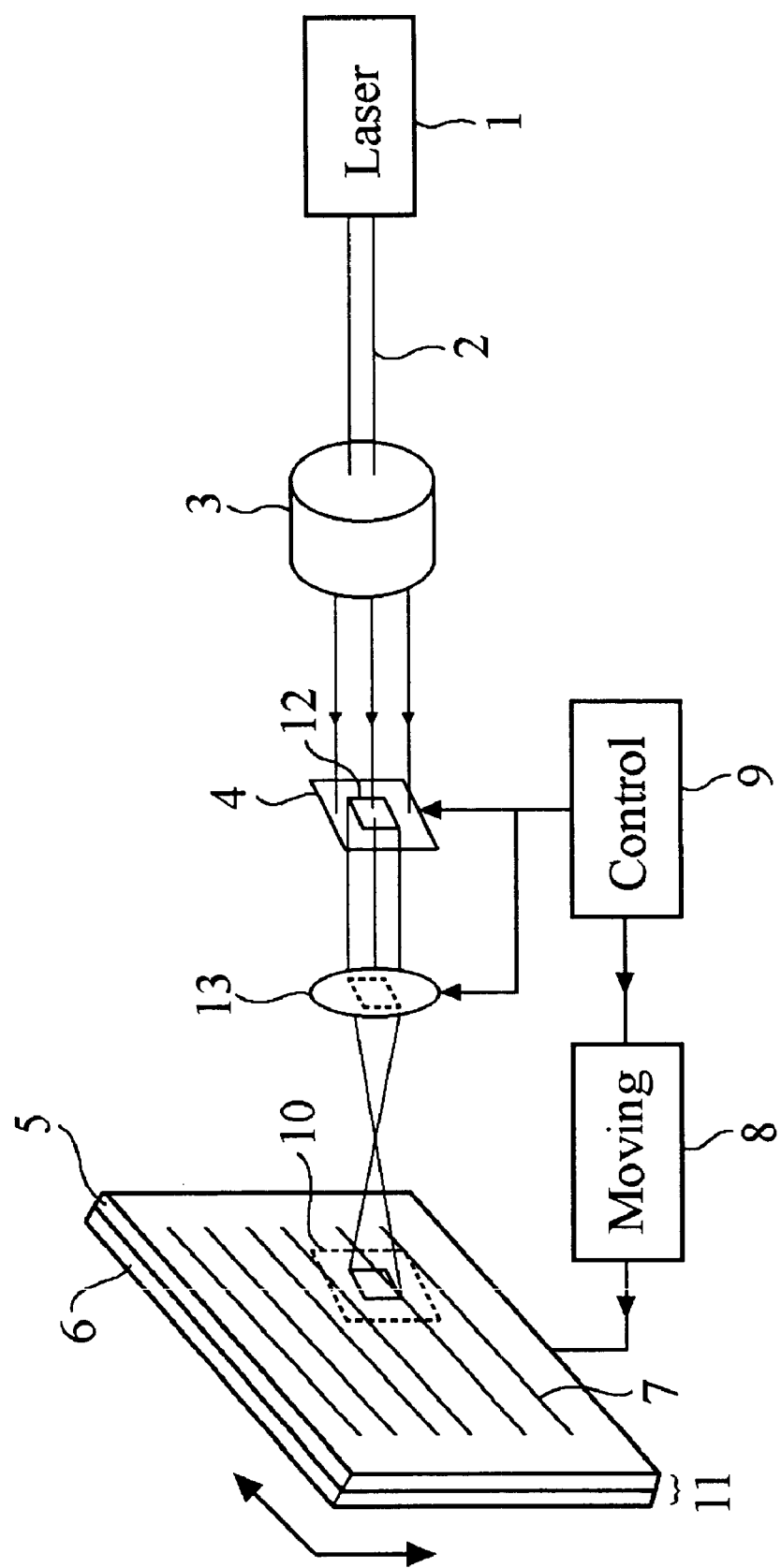
FIG. 1 is a schematic diagram of an apparatus for fabricating a lenticular plate in accordance with the present invention.

As shown in FIG. 1, the apparatus for fabricating a lenticular plate comprises: a collimator 3 for collimating a beam 2 from a laser 1 to a predetermined diameter; a mask 4 for adjusting the intensity distribution of the collimated beam; a photoplate 11, on which a photosensitive layer 6 of a photosensitive material is deposited; a means 13 for directing the beam which has passed through the mask to a desired region of the photoplate; and a means 9 for controlling the mask 4 and the means 13 for directing the beam such that the laser beam of predetermined intensity distribution irradiates on the desired portion of said photoplate 11.

The diameter of the beam 2 from the laser 1 is adjusted to a desired value by the collimator 3.

The laser beam 2 has a Gaussian intensity distribution The mask 4 has a transmission function such that the collimated beam has a desired intensity distribution after it has passed through the mask 4. The laser beam produces an image of a lens of desired parameters on the photosensitive layer 6 of the photoplate 11. In one embodiment of the invention, the mask 4 can be comprised of a material which passes the laser beam. The material of the mask has density distribution which is proportional to the desired transmission function of the mask. In another embodiment, the thickness distribution of the material of the mask 4 is proportional to the desired transmission function of the mask. In yet another embodiment, the mask 4 is a spatial light modulator (e.g., electro optic crystal) which modulates the laser beam to produce the desired intensity distribution.

The laser beam passing through the mask 4 is directed to a desired region of the photosensitive layer of the photoplate 11 by the adjusting means 13. In an embodiment of the invention, the adjusting means is a convex lens which focuses the laser beam to the desired diameter at a desired location on the photosensitive layer 6 of the photoplate 11.

The photoplate 11, on which the laser beam finally produces a shape of a lens, is a transparent plate 5 on which a photosensitive layer 6 of a photosensitive material has been deposited. The transparent plate 5 consists of an optically transparent material, such as glass, plastic, or crystal. The photosensitive layer 6 should be thicker than the lens to be formed on the photoplate 11. The laser beam from the adjusting means 13 passes through the transparent plate 5 and reaches the photosensitive layer 6 of the photoplate 11. The photoplate 11 is moved in a direction perpendicular to the beam by a moving means 8. A control means 9 controls the moving means 8, and, also, adjusts the transmission function of the mask 4. In this way, the control means 9 simultaneously controls the moving means 8 and the transmission function of the mask 4, to form an image of lens having a desired characteristic on a desired location of the photoplate 11.

Figure 2A:
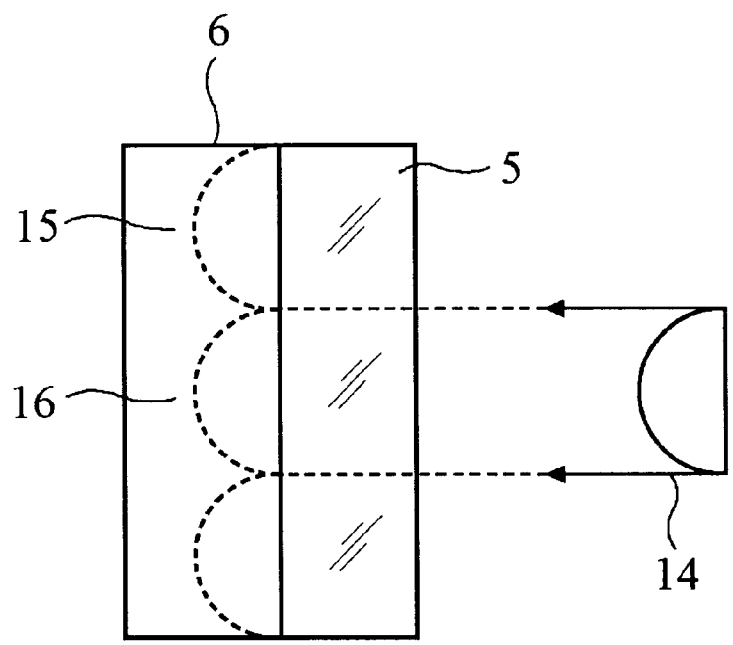
FIGS. 2a and 2b are cross-sectional views of the photoplate which illustrate hardening of the photosensitive layer by the laser beam in accordance with the present invention.
Figure 2B:
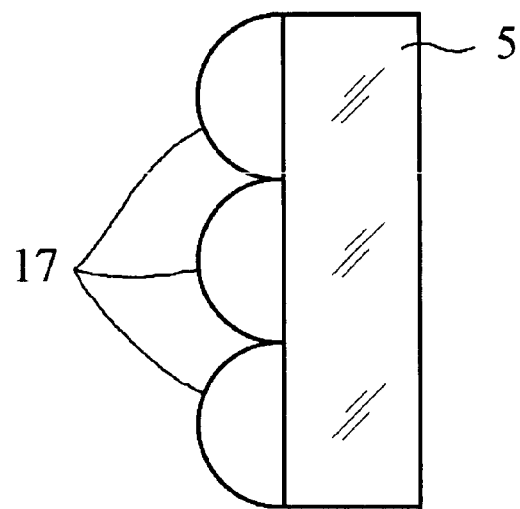

As shown in FIGS. 2a and 2b, when a laser beam having a desired intensity distribution passes through the transparent plate 5 and irradiates the photosensitive layer 6, sensitizers in the photosensitive layer 6 absorb the laser beam, and, the photosensitive layer 6 hardens. As the laser beam propagates through the photosensitive layer 6, the intensity of the laser beam decreases due to absorption by the photosensitive layer 6. Since the degree of hardening is proportional to the decrease of the intensity of the beam, the photosensitive layer 6 consists of a completely hardened regions 16 and an unhardened or incompletely hardened region 15. The locus of the completely hardened regions 16 is determined by the intensity distribution of the laser beam.

When DCG is used as the photosensitive material in an embodiment of the invention, the photoplate 11 is soaked in warm water after the photosensitive layer 6 has been irradiated. The DCG regions which are unhardened or incompletely hardened dissolve in the water, and only the hardened DCG regions remain on the photoplate 11 after it has been soaked. In this way, a lens having a desired shape can be formed on the photoresistive layer 6 of the photoplate 11.

Figure 3:
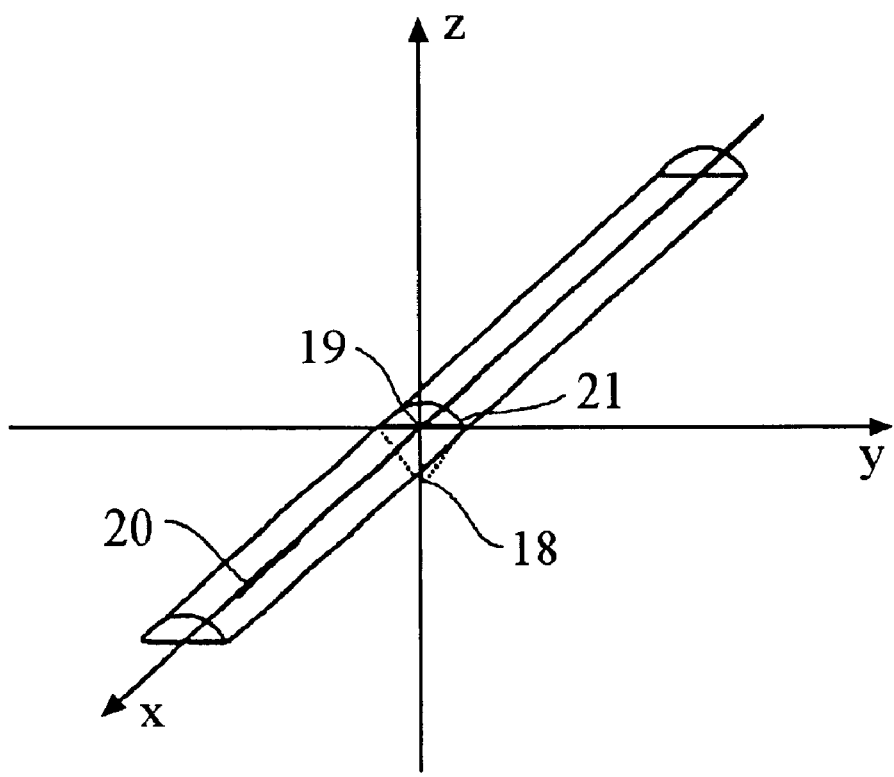
FIG. 3 is a perspective view of a cylindrically symmetric lens shape formed on the photoplate in accordance with the present invention.

As shown in FIG. 3, if the z-axis passes through the center 18 of curvature and the center 19 of the lens, the x-axis is perpendicular to the z-axis and passes through the center 19 of the lens longitudinally, and the y-axis is perpendicular to both the z-axis and x-axis and passes through the center 19 of the lens. Further, if the laser beam propagates in a direction parallel to the z-axis wit $T_{00q}$ mode and the separable transmission function of the mask is T(x, y)=T(x)·T(y), the transmission function T(y) is given by:

$$T(y) = \frac{y^2}{\omega_0^2} + \alpha\sqrt{R^2 - y^2} + \ln\frac{I_c}{I_0} - \alpha \cdot l - \ln\left\{\int_{-\infty}^{\infty} e^{-\frac{x^2}{\omega_0^2}} dx \cdot T(x)\right\} \quad \text{Equ. 1}$$

In Equ. 1, x is a coordinate value on the x-axis, y is a coordinate value on the y-axis, $\omega_0$ is a radius of the laser beam at $1/e^2$ level, $\alpha$ is absorption coefficient of the photosensitive material, R is the radius of curvature of the cylindrical lens, $I_0$ is the intensity of the laser beam on the center of the laser beam, 1. is the intensity of the laser beam needed to form a lens of desired thickness in the y direction. and T(x) is a predetermined function. $I_o$ is determined by the temperature of the developer on which the photosensitive material dissolves. In Equ. 1, the transmission function of the mask 4 is determined by the intensity distribution of the laser beam, the absorption coefficient of the photosensitive material, and the characteristic of the lens to be formed in the photoplate 11. In other words, $I_0$, $\omega_0$, $\alpha$, R, 1, and T(x) are determined by a user, while $I_c$ is determined by experiment, Thus, T(y) can be determined from Equ. 1. Further, if the diameters of the laser beam in x and y directions are different, T(y) can be determined more easily since the first term in the right side of the Equ. 1 is independent on the x direction.

According to the present invention, lenticular plates having desired characteristics can be fabricated without preparing a master plate corresponding to each desired characteristic, by simply adjusting the transmission function of the mask 4.

What is claimed is:

1. A method for fabricating a lenticular plate, the method comprising the steps of:

depositing a photoplate with a layer of a photosensitive material;

collimating a beam from a laser to a predetermined diameter;

masking the collimated beam with a mask to adjust the intensity distribution of the collimated beam; and controlling the mask and the beam which has passed through the mask in the masking step such that the laser beam of predetermined intensity distribution irradiates on a desired region of said photoplate, wherein the photosensitive material is a light hardening material which hardens by the irradiation of the laser beam, the light hardening material contains photo sensitizers that absorb the laser beam, and the shape of the lens to be made on the photoplate is determined by the predetermined intensity distribution of the beam and the absorption coefficient of the photo sensitizers.

2. The method of claim 1 wherein said masking step includes masking the beam such that the collimated beam has a predetermined intensity distribution after it has passed through said mask.

3. The method of claim 2 wherein the predetermined transmission function T(y) is given by:

$$T(y) = \frac{y^2}{\omega_0^2} + \alpha\sqrt{R^2 - y^2} + \ln\frac{I_c}{I_0} - \alpha \cdot l - \ln\left\{\int_{-\infty}^{\infty} e^{-\frac{x^2}{\omega_0^2}} dx \cdot T(x)\right\}$$

where x is a coordinate value on a longitudinal axis of a cylindrically symmetric lens to be formed on the photoplate, y is a coordinate value on lens pitch axis of the cylindrically symmetric lens, $\omega_0$ is a radius of the beam, $\alpha$ is absorption coefficient of the photosensitive material, R is the radius of curvature of the cylindrically symmetric lens, $I_0$ is the intensity of the beam on the center of the beam, $I_c$ is the intensity of the beam needed to form a lens of desired thickness in the y direction, and T(x) is a predetermined function.

4. The method of claim 1 wherein said steps of controlling further comprises steps of:

adjusting the size of the region of said photoplate on which the beam reach; and moving the beam in a direction which is perpendicular to the beam.

5. The method of claim 4, wherein the step of adjusting the size of the region of said photoplate uses an optical lens.

6. The method of claim 1, wherein the light hardening material is dichromated gelatine (DCG).

* * * * *